(12) United States Patent
Minabe (10) Patent No.: US 7,982,932 B2
(45) Date of Patent: Jul. 19, 2011

(54) HOLOGRAM DECODING APPARATUS, HOLOGRAM DECODING METHOD AND COMPUTER READABLE MEDIUM

(75) Inventor: Jiro Minabe, Minamiashigara (JP)

(73) Assignee: Fuji Xerox Co., Ltd., Tokyo (JP)

(*) Notice: Subject to any disclaimer, the term of this patent is extended or adjusted under 35 U.S.C. 154(b) by 466 days.

(21) Appl. No.: 12/112,054

(22) Filed: Apr. 30, 2008

(65) Prior Publication Data

US 2009/0080043 A1 Mar. 26, 2009

(30) Foreign Application Priority Data

Sep. 21, 2007 (JP) ................. 2007-245387

(51) Int. Cl.
*G03H 1/16* (2006.01)
(52) U.S. Cl. ............................ 359/29; 359/10
(58) Field of Classification Search .................. 359/10, 359/11, 22, 29, 32
See application file for complete search history.

(56) References Cited

U.S. PATENT DOCUMENTS

| | | | | |
|---|---|---|---|---|
| 5,450,218 A | * | 9/1995 | Heanue et al. | 359/21 |
| 5,727,226 A | * | 3/1998 | Blaum et al. | 359/35 |
| 6,414,763 B1 | * | 7/2002 | Hesselink et al. | 359/21 |
| 6,788,443 B2 | * | 9/2004 | Ayres et al. | 359/22 |
| 6,995,882 B2 | * | 2/2006 | Horimai | 359/2 |
| 7,116,626 B1 | * | 10/2006 | Woods et al. | 369/103 |
| 2005/0270609 A1 | * | 12/2005 | Chuang et al. | 359/22 |
| 2007/0103750 A1 | * | 5/2007 | Horimai | 359/22 |

FOREIGN PATENT DOCUMENTS

JP 2001-75463 A 3/2001

* cited by examiner

*Primary Examiner* — Frank G Font
(74) *Attorney, Agent, or Firm* — Sughrue Mion, PLLC (57) ABSTRACT

A hologram decoding apparatus includes: an imaging device that receives a reproduced image obtained by reading an encoded image from a hologram recording medium in which a Fourier transform image of the encoded image with n pixels representing digital information is recorded, n being an integer of 2 or more, and that outputs the reproduced image with k resolution pixel numbers, k being an integer more than n; a storing unit that stores decoding patterns and digital information corresponding to the decoding patterns, wherein a decoding pattern from among the decoding patterns corresponds to the reproduced image, which is encoded with m pixels of k≧m>n; and a decoding unit that refers to the decoding patterns to specify the decoding pattern; and that carries out a decoding process to set the digital information corresponding to the specified decoding pattern as digital information of the reproduced image.

6 Claims, 8 Drawing Sheets

|  |  |  |
|---|---|---|
| 255 | 0 | 255 |
| 0 | 255 | 0 |
| 0 | 0 | 0 |

FIG. 5

| CODE | RECORDING PATTERN |
|------|-------------------|
| 0000 | 255 255 255 / 0 0 0 / 0 0 0 |
| 0001 | 255 255 0 / 255 0 0 / 0 0 0 |
| ⋮ | ⋮ |

HOLOGRAM DECODING APPARATUS, HOLOGRAM DECODING METHOD AND COMPUTER READABLE MEDIUM

CROSS-REFERENCE TO RELATED APPLICATION

This application is based on and claims priority under 35 USC §119 from Japanese Patent Application No. 2007-245387 filed Sep. 21, 2007.

BACKGROUND (i) Technical Field

The present invention relates to a hologram decoding apparatus, a hologram decoding method and a computer readable medium.

(ii) Related Art

A hologram recording and reading (reproducing) technique includes a Fourier transform hologram technique for changing binary digital data into an encoded image by using a comparatively bright pixel and a comparatively dark pixel, modulating light by using the encoded image to obtain signal light, carrying out the Fourier transform over the signal light and recording the signal light as a hologram, performing the inverse Fourier transform and carrying out a reproduction to obtain an encoded image, and decoding the encoded image to obtain digital data.

Some digital information is represented in a bright-dark two-dimensional pattern in which a part of pixels in a pixel block having the pixels arranged two-dimensionally is set to be "bright". In the decoding operation, in a reproduced image (an encoded image) from the Fourier transform hologram, a luminance in a corresponding position to each of the pixels is measured and a threshold is set based on a result of the measurement to decide a brightness and darkness for each pixel in the reproduced image depending on whether the luminance is higher than the threshold or not.

When arranging a number of pixels two-dimensionally and decoding an encoded image representing digital information depending on the brightness and darkness of each pixel, reference is made to a luminance in a corresponding position to each pixel in the encoded image thus obtained.

SUMMARY

According to an aspect of the invention, there is provided a hologram decoding apparatus including:

a light receiving unit including an imaging device that receives a reproduced image obtained by reading an encoded image from a hologram recording medium in which a Fourier transform image of the encoded image having n pixels representing digital information is recorded, wherein n is an integer of 2 or more, and that outputs the reproduced image having k resolution pixel numbers, wherein k is an integer more than n;

a storing unit that stores a plurality of decoding patterns and digital information corresponding to the decoding patterns, wherein each decoding pattern has m pixels and k≧m>n; and a decoding unit that refers to the decoding patterns stored in the storing unit to specify one of the decoding patterns which corresponds to the reproduced image, wherein the decoding unit carries out a decoding process to set the digital information corresponding to the specified decoding pattern as digital information of the reproduced image.

BRIEF DESCRIPTION OF THE DRAWINGS

Embodiments of the present invention will be described in detail based on the following figures, wherein.

DETAILED DESCRIPTION

Figure 1:
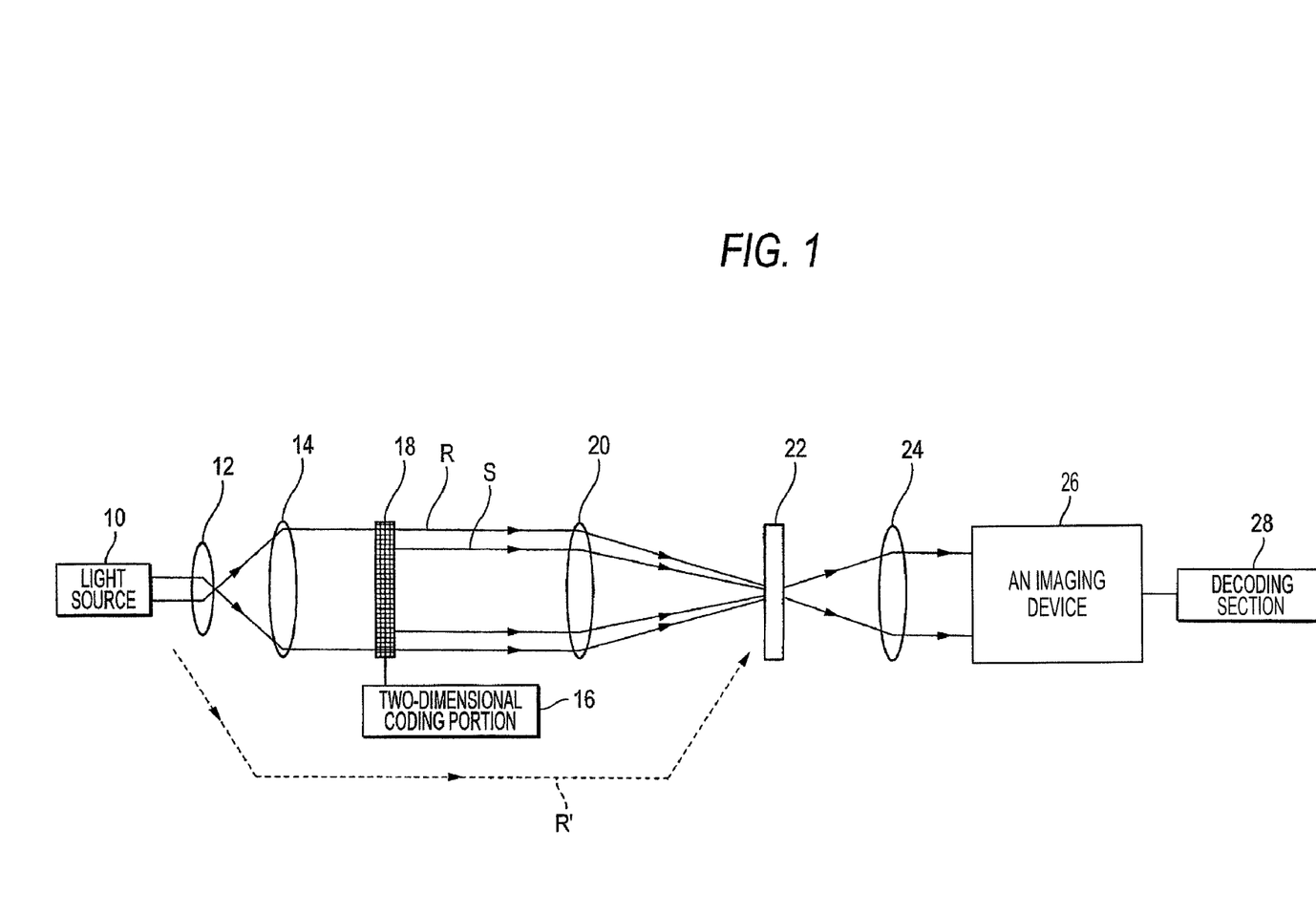
FIG. 1 is a view showing a hologram recording and reading (reproducing) apparatus including a reading apparatus according to an exemplary embodiment of the invention.

An exemplary embodiment according to the invention will be described with reference to the drawings. FIG. 1 shows an example of structures of a hologram decoding apparatus and an apparatus for generating a hologram to be read and decoded therethrough (a hologram recording, reading (reproducing) and decoding apparatus) according to the embodiment of the invention. The hologram recording, reading and decoding apparatus in FIG. 1 is constituted to include a light source 10, lenses 12 and 14, a two-dimensional encoding portion 16, a spatial light modulator 18, a Fourier transform lens 20, an inverse Fourier transform lens 24, an imaging device 26 (e.g., a photodetector), and a decoding section 28. A light source for reference light (which will be described below), the inverse Fourier transform lens 24, the imaging device 26, and the decoding section 28 serve as a reading and decoding apparatus according to the embodiment.

Coherent light emitted from the light source 10 is changed into collimated light having a large diameter through the lenses 12 and 14 and is incident on the spatial light modulator 18. The spatial light modulator 18 is constituted by a liquid crystal panel, for example, and displays an encoded image generated by the two-dimensional encoding portion 16 constituted by a computer, for example. The encoded image has a pixel block representing a code arranged two-dimensionally in a contrast pattern in which n indicates a natural number, p indicates a positive integer of n>p, and p pixels in n pixels are set to be "bright". The pixel block will be described below.

The light passing through the spatial light modulator 18 is subjected to an intensity modulation depending on a value of each pixel in the encoded image and is thus changed into a signal light S. The signal light S is subjected to the Fourier transform through the Fourier transform lens 20 and is irradiated in an optical recording medium 22 held by a holding unit (a holder) which is not shown. Moreover, reference light R shares an optical axis with the signal light S and is irradiated in the optical recording medium 22 at an outside thereof. Consequently, the signal light S subjected to the Fourier transform and the reference light R interfere with each other in the optical recording medium 22 and the signal light S is recorded as a hologram on the optical recording medium 22.

The spatial light modulator 18 of a transmission type is taken as an example and may be of a reflection type. In the example of FIG. 1, there is employed a so-called collinear system in which the reference light R and the signal light S are irradiated in the optical recording medium 22 through a coaxial optical system. However, it is also possible to employ a two beam system for irradiating, on the optical recording medium 22, the coherent light emitted from the light source 10 as reference light R' passing through a separate optical path from the signal light S through a beam splitter and a proper reflecting mirror which are not shown. In particular, any irradiating optical path for a recording light may be employed.

By the process, the signal light S subjected to the Fourier transform and the reference light R interfere with each other in the optical recording medium 22, and the signal light S is recorded as the hologram in the optical recording medium 22.

Figure 2A:
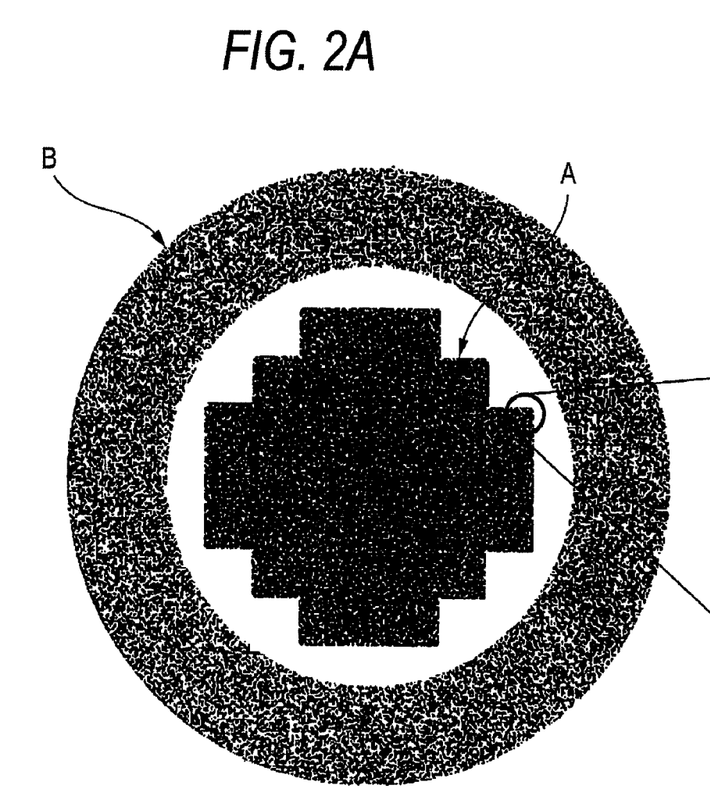
FIGS. 2A and 2B are views showing an example of an image displayed on a spatial light modulator of the hologram recording and reading apparatus.
Figure 2B:
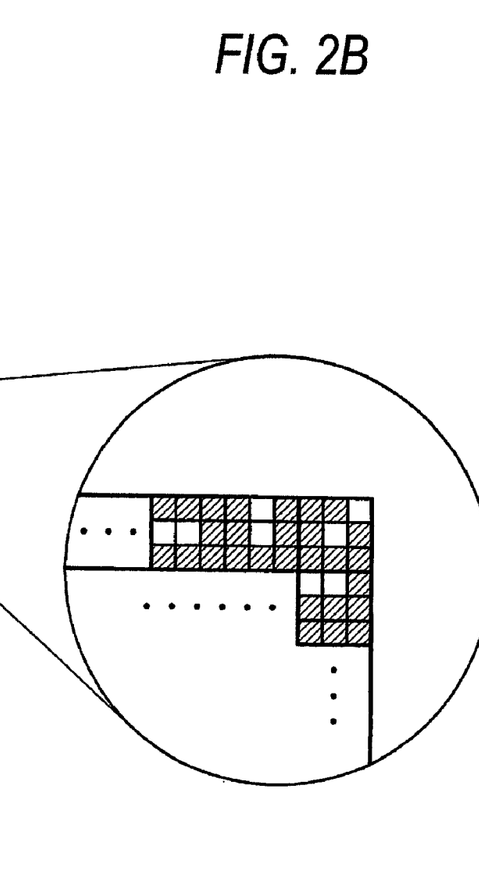

FIGS. 2A and 2B show an example of an image to be displayed on the spatial light modulator 18. In FIG. 2A, an encoded image is displayed on a central region A, a light passing therethrough is changed into the signal light S and the reference light R passes through an outer peripheral region B. Moreover, FIG. 2B is an enlarged view showing a part of the encoded image, illustrating an example in which a pixel block to be described below is arranged.

Figure 3:
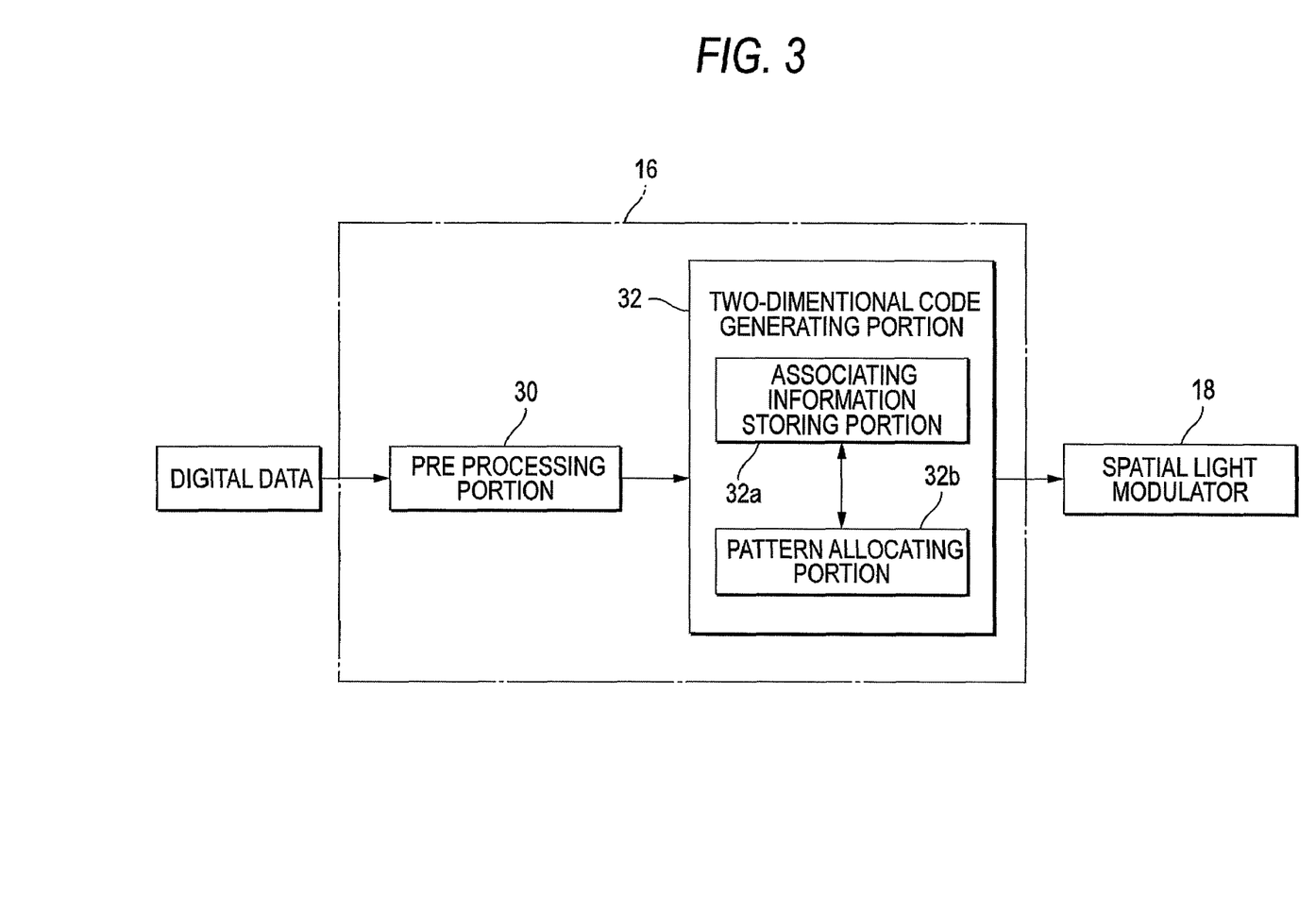
FIG. 3 is a diagram showing an example of a structure according to an embodiment of a two-dimensional encoding portion in the hologram recording and reproducing apparatus.

FIG. 3 shows an example of a structure according to an embodiment of the two-dimensional encoding portion 16. As shown in FIG. 3, the two-dimensional encoding portion 16 is constituted to include a preprocessing portion 30 and a two-dimensional code generating portion 32.

The preprocessing portion 30 includes a microcomputer including a central processing unit (CPU) and a memory for storing a program to be processed by the CPU. The program may be provided in a storage state in a computer readable storing medium such as a DVD-ROM and may be copied from the storing medium. The preprocessing portion 30 carries out a processing of receiving binary digital data and giving an error correcting bit to the binary digital data and an interleave processing of distributing a bit string of data as a countermeasure to be taken against a burst error. In the embodiment, the preprocessing portion 30 is not always required.

The two-dimensional code generating portion 32 receives the processed digital information as a two-dimensional code generation processing target from the preprocessing portion 30 (exactly receives the binary digital information if the preprocessing portion 30 is omitted), and generates a pixel block representing a corresponding code. The two-dimensional code generating portion 32 is constituted to include an encoding associating information storing portion 32a and a pattern allocating portion 32b.

The encoding associating information storing portion 32a is constituted by a magnetic storage device such as a random access memory (RAM) or a hard disk device which is used as a work memory of a CPU and other computer readable storage devices, for example. The encoding associating information storing portion 32a can be implemented as a look-up table (LUT), for example, and serves to store associating information for associating digital information with a pixel block. In the embodiment, binary digital information having a length (for example, N bits) is associated with individual pixel blocks.

The pattern allocating portion 32b includes a CPU and a program for controlling a processing operation of the CPU, and allocates a pixel block based on the associating information to the digital information received from the preprocessing portion 30 and outputs the information to the spatial light modulator 18. The program may be stored in a computer readable recording medium such as a DVD-ROM and may be thus provided, and may be written to the CPU.

The preprocessing portion 30 and the pattern allocating portion 32b may be constituted by a dedicated hardware (for example, ASIC).

Figure 4:
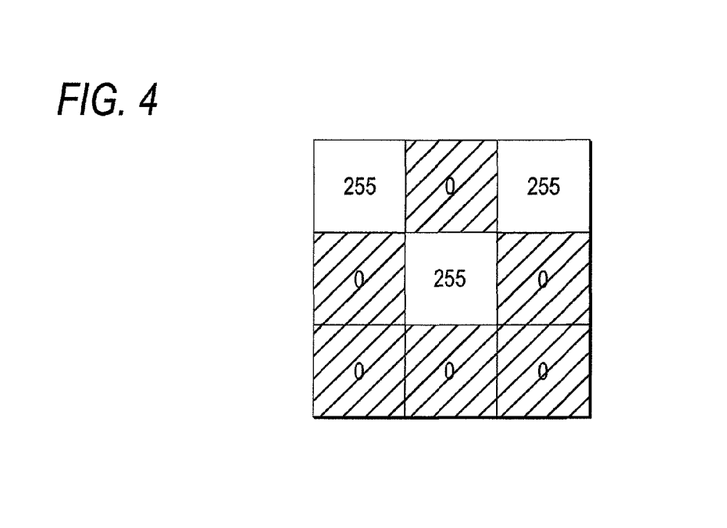
FIG. 4 is a diagram showing an example of a pixel block generated by the hologram recording and reproducing apparatus.

FIG. 4 shows an example of the pixel block. Since the pixel block represents a contrast pattern to be used in a recording operation, it will be hereinafter referred to as a recording pattern.

As described above, the recording pattern takes a shape, for example, has n pixels which are arranged to take a two-dimensional rectangular shape. A plurality of positive integers p which is smaller than n is defined, and p pixels in the n pixels are set to have a different luminance from (n-p) pixels, thereby determining a pixel block (a recording pattern). For example, n pixels are set to be comparatively bright and (n-p) pixels are set to be comparatively dark. Herein, it is assumed that the luminance is represented in stages of 0 to 255, and a darkness is greater with a smaller value of the luminance.

In the following example, it is assumed that a pixel block (a recording pattern) having n=9 pixels arranged in 3 rows and 3 columns is generated. In other words, n=9 is set. Moreover, it is assumed that p=3 is determined. A pixel shown in an oblique line indicates a dark pixel and a pixel having no oblique line indicates a bright pixel. The number of the recording patterns is equal to a combination taking three of nine pixels, that is, 84 combinations, and can be therefore caused to correspond to a digital value which is equal to or smaller than 84. More specifically, this is generally referred to as a modulation encoding method.

Figure 5:
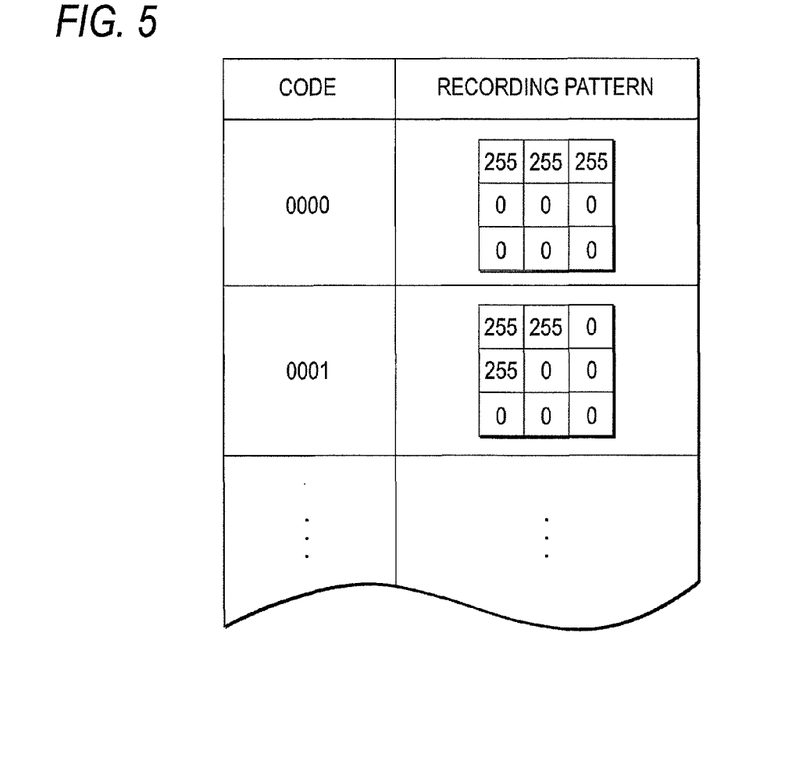
FIG. 5 is a diagram showing examples of associating information held by the hologram recording and reproducing apparatus.

FIG. 5 shows an example of the associating information stored in the encoding associating information storing portion 32a. FIG. 5 shows a look-up table in which the recording pattern of n=9 pixels (3 rows and 3 columns) is associated with each of N-bit digital information.

When accepting information to be an encoding target, the two-dimensional encoding portion 16 converts the information into a binary bit string. Then, the bit string is divided, for example, into partial bit strings and a code for an error correction is added to each partial bit string which is obtained by the division. The two-dimensional encoding portion 16 links the partial bit string to which the error correction code is added and divides the partial bit string every encoding length (8 bits) associated with the recording pattern. The code having the 8-bit length which is obtained by the division is sequentially set to be a noted code, and a recording pattern corresponding to the noted code is acquired by referring to the associating information.

Then, the recording patterns thus acquired are sequentially arranged in a predetermined shape to generate a an encoded image illustrated in FIG. 2B. The encoded image is displayed on the spatial light modulator 18. Consequently, the light emitted from the light source 10 is modulated and is subjected to the Fourier transform, and is thus recorded on the optical recording medium 22.

Next, description will be given to an operation to be carried out when reading information from a diffracted light of a hologram in the apparatus shown in FIG. 1. In case of the apparatus shown in FIG. 1, the coherent light emitted from the light source 10 is set to be only the reference light R through the spatial light modulator 18, is subjected to the Fourier transform by the Fourier transform lens 20 and is irradiated as reading light in the optical recording medium 22. In this case, the signal light S transmitted through the central region A of the spatial light modulator 18 shown in FIG. 2 may be intercepted to carry out a control for transmitting only the reference light R through the outer peripheral region B. Thus, an image of the diffracted light generated from the hologram is formed on the imaging device 26 to be a light receiving unit through the inverse Fourier transform lens 24 so that a reproduced image is obtained. A signal output from the imaging device 26 receiving the diffracted light, that is, a reproduced image representing the encoded image is input to the decoding section 28 implemented by the computer. The decoding section 28 decodes and outputs the information included in the hologram.

Figure 6:
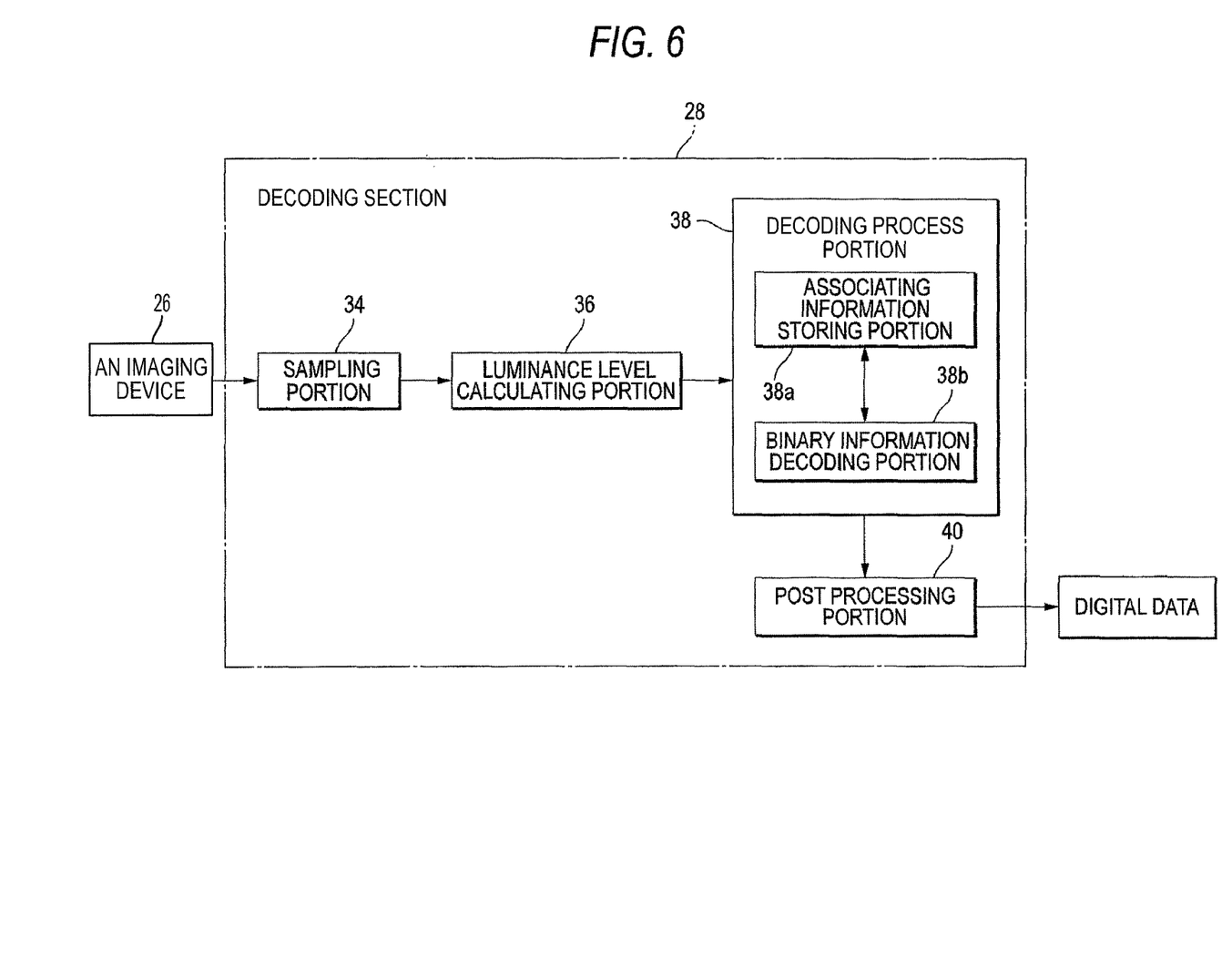
FIG. 6 is a diagram showing an information acquiring portion in the hologram recording and reproducing apparatus.

FIG. 6 shows an example of a structure according to an embodiment of the decoding section 28. As shown in FIG. 6, the decoding section 28 is functionally constituted to include a luminance level calculating portion 36, a decoding process portion 38 and a postprocessing portion 40.

A sampling portion 34 samples a luminance value of an output signal of the imaging device 26 (a reproduced image of an encoded image). In this case, oversampling is carried out with a higher resolution (e.g., k resolution pixel numbers, wherein k is an integer more than n) than that of the pixel block of the recording pattern. More specifically, samples of a plurality of luminance values are detected in each pixel of the recording pattern.

The luminance level calculating portion 36 is implemented by a circuit including a CPU and a storing portion (not shown) which holds a program for controlling the processing operation of the CPU, for example. The program may be stored in a computer readable recording medium such as a DVD-ROM and may be thus provided, and may be copied on the CPU. The luminance level calculating portion 36 defines a plurality of regions obtained by dividing the reproduced image acquired through the imaging device 26 in accordance with a predetermined rule. By referring to the luminance value obtained from the pixel included in each of the defined regions, then, a luminance in a corresponding position to each of pixels of a contrast pattern (hereinafter referred to as a decoding pattern which corresponds to a reference image) held by decoding associating information storing portion 38a which will be described below, that is, a luminance level value is determined. As a method of determining the luminance level value, a mean value of the luminance sampled in the corresponding region to each pixel of the decoding pattern may be calculated to obtain the luminance level value. Alternatively, a luminance sampled in the closest position to a center of each pixel of the decoding pattern may be typically fetched as the luminance level value. Moreover, a luminance value of central coordinates in each pixel of the decoding pattern may be interpolated from luminance values of a plurality of peripheral pixels by a well-known interpolating method to obtain the luminance level value.

In this case, the luminance level calculating portion 36 may correct a distortion of the reproduced image of the encoded image by using a marker buried previously in the encoded image prior to the processing of carrying out a division into the regions.

The decoding process portion 38 accepts luminance level information to be a set of luminance level values from the luminance level calculating portion 36. Then, the decoding process portion 38 detects a corresponding region (a pixel block) to the recording pattern which is included in the luminance level information and decodes digital information corresponding to the contrast pattern of the pixel block by referring to the associating information held by the decoding associating information storing portion 38a which will be described below. Moreover, the decoding processing is not restricted to a processing of outputting digital information corresponding to the contrast pattern of the pixel block but may serve to carry out an error correction processing for the digital information or a calculation for decoding a cipher and to then output the digital information thus processed.

For example, the decoding process portion 38 is constituted to include the decoding associating information storing portion 38a to be a storing unit and a binary information decoding portion 38b. The decoding associating information storing portion 38a takes the same structure as the encoding associating information storing portion 32a and stores associating information for associating digital information with a contrast pattern of a pixel in a pixel block. The contrast pattern held by the decoding associating information storing portion 38a is a decoding pattern which will be described below (a reference image) and is different from the recording pattern in the encoding associating information storing portion 32a.

More specifically, in the embodiment, a pattern (a decoding pattern) of a pixel element to be used for a comparison with the reproduced image in the decoding operation includes m (m>n) pixels, m being greater than the number n of pixels of a recording pattern to be an image element used in the recording operation. In the decoding pattern, a luminance in a corresponding position to each of the m pixels in the reproduced image is set.

Figure 7A:
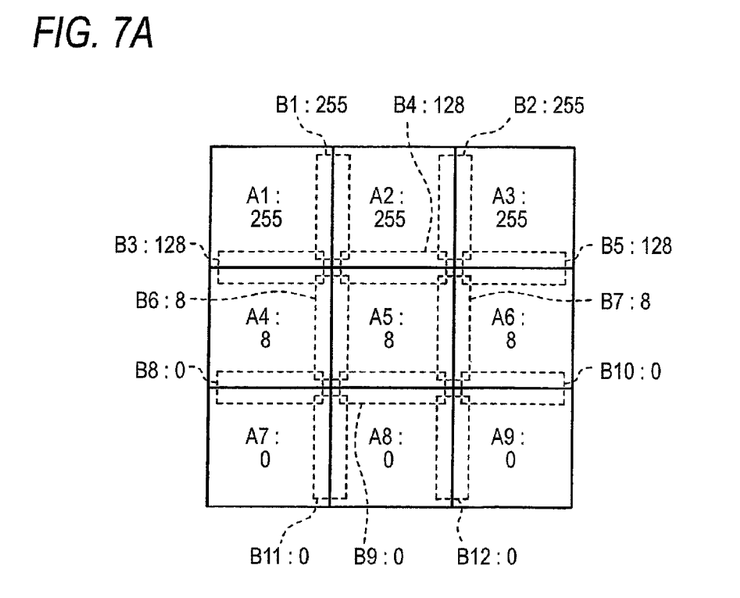
FIGS. 7A and 7B are explanatory diagrams illustrating examples of a decoding pattern to be used in a decoding operation in the hologram recording and reproducing apparatus.

FIGS. 7A and 7B show examples of the decoding pattern (the reference image) held by the decoding associating information storing portion 38a. As shown in FIG. 7A, in the decoding pattern, a pixel is also disposed in adjacent portions (B1 to B12) of pixels corresponding to the pixel of the recording pattern illustrated in FIG. 4 together with the corresponding pixels A1 to A9 (hereinafter referred to as "corresponding pixels": A1 to A9).

Figure 7B:
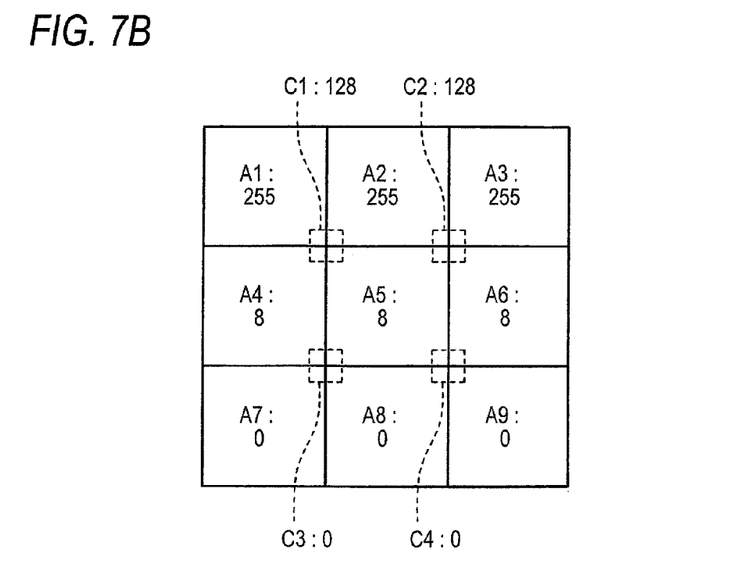

In another example, moreover, a pixel is also disposed, together with the corresponding pixel (A1 to A9), in a corresponding position to a middle point of pixels which are adjacent to each other in a different direction from a periodical direction of the corresponding pixel, that is, a corresponding position (C1 to C4) to a middle point in a region of 2×2 pixels of the corresponding pixel as shown in FIG. 7B. The pixel may be provided in both the adjacent places and the middle point of the region of 2×2 pixels. In FIG. 7(b), the pixel is disposed on two crossing axes. Therefore, the pixel is disposed on a intersection of a boundary line between pixel strings in one of directions and a boundary line between pixel strings in the other direction, that is, a central part of the kanji-character "田".

Thus, pixels (non-corresponding pixels) other than the corresponding pixels may be disposed between the corresponding pixels. A position in which the non-corresponding pixels are disposed is preferably set to be a position in which a deterioration is predicted in the reproduced image of the encoded image. Accordingly, they may be disposed in different positions every decoding pattern. Referring to the prediction of the deterioration, for example, it is sufficient to predict that the deterioration is generated more greatly in a place in which a spatial frequency is higher in case of the Fourier transform hologram for carrying out recording by utilizing the Fourier transform lens having a limited size. In this case, the non-corresponding pixel is disposed in such a position as to satisfy the condition that the spatial frequency can exceed a threshold. The position is a boundary position between the pixels, particularly, a middle point of oblique and adjacent pixels, that is, a central part of the 2×2 pixels which correspond to C1 to C4 in FIG. 7B, for example.

The binary information decoding portion 38b is implemented by a circuit including a CPU and a memory for holding a program to be processed by the CPU, for example. The program may be stored in a computer readable recording medium such as a DVD-ROM and may be provided, and may be thus copied thereon.

The binary information decoding portion 38b decodes the digital information corresponding to the pixel block included in the encoded image based on the associating information held in the decoding associating information storing portion 38a.

For example, the binary information decoding portion 38b detects a corresponding region to the pixel block in the luminance level information received from the luminance level calculating portion 36. Then, one of the corresponding regions to the pixel block is selected as a noted region, and the luminance level information in the noted region is compared with the decoding pattern held in the decoding associating information storing portion 38a.

The binary information decoding portion 38b compares a luminance value of a pixel included in the decoding pattern with a luminance level value corresponding to each pixel of luminance level information in the noted region. For example, in the case in which a difference between the luminances is smaller than a predetermined threshold, it is preferable to decide that contrast patterns are coincident with each other. Alternatively, it is also possible to obtain a pattern in which a sum of squares of the difference between the luminances of the respective pixels is a minimum.

In the case in which the contrast patterns are coincident with each other, a code associated with a pertinent decoding pattern is read and output from the decoding associating information storing portion 38a. On the other hand, if the contrast patterns are not coincident with each other, a next decoding pattern is read to continuously carry out the processing.

The processing is repeated every region corresponding to each pixel block in the luminance level information and information represented by each region is output.

In this case, a statistic of the luminance level information (for example, minimum and maximum values of the luminance value or minimum and maximum values of a peak value of an appearance frequency of the luminance value) may be previously calculated as a criterion value through the luminance level calculating portion 36 and the luminance value of the pixel of the decoding pattern may be corrected based on the criterion value. As an example, a luminance value $\eta$ of each pixel of the decoding pattern shown in FIG. 7 is corrected by using values of MIN and MAX output from the luminance level calculating portion 36 as follows:

$$\eta \times (MAX-MIN)/255+MIN.$$

Based on the value obtained after the correction, the luminance values may be compared with each other.

The postprocessing portion 40 is implemented by a circuit including a CPU and a memory for holding a program to control the processing operation of the CPU and returns, into an original array, a distributed bit string input from the decoding process portion 38 to carry out a deinterleave processing, and performs an error correction to reproduce original digital data. In the case in which the preprocessing portion 30 is omitted, the postprocessing portion 40 is also omitted. The program may also be stored in a computer readable recording medium such as a DVD-ROM and may be provided, and may be copied and stored therein.

Although the minimum value MIN and the maximum value MAX are exactly set to be the criterion values, they are not restricted thereto. For example, a criterion value to be "bright" may be set to be α×MAX by using a correction value α. Similarly, a criterion value to be "dark" may be set to be β×MIN by using a correction value β. The correction values α and β are positive real numbers and may be equal to each other or different from each other. As an example, the correction values α and β can be experimentally predetermined every reproducing apparatus, for instance, may be set to α=0.6 and β=1.2, and may be set every reproduced image of the encoded image.

By using the criterion value calculated through the luminance level calculating portion 36, moreover, it is also possible to change the luminance level information into a binary value and to then compare the binary value with the decoding pattern.

Moreover, the luminance level calculating portion 36, the binary information decoding portion 38b and the postprocessing portion 40 may be constituted by a dedicated hardware (for example, ASIC).

In the description, although the recording pattern is encoded by the so-called modulation encoding method in which n pixels are arranged two-dimensionally, p is set to be a positive integer of n>p, the p pixels in the n pixels are set to be "bright" and the pixel block (the pixel element) representing a code is arranged in the contrast pattern, this is not restricted. For example, n pixels may be arranged straight. In case of the two-dimensional array, moreover, the pixel needs to be arranged in neither a matrix nor a square shape. In this case, the decoding pattern is also set corresponding to the shape of the recording pattern.

For example, it is also possible to use two patterns in which either of 1×2 pixels is set to be "bright" and the other is set to be "dark", thereby setting a pixel block representing a code of "0" or "1" depending on whether any of them is "bright" (an image obtained through a so-called differential encoding method). In the case in which the p pixels in the n pixels are set to be "bright", the number p of the pixels to be "bright" does not need to be fixed but plural numbers of p may be set.

Figure 8:
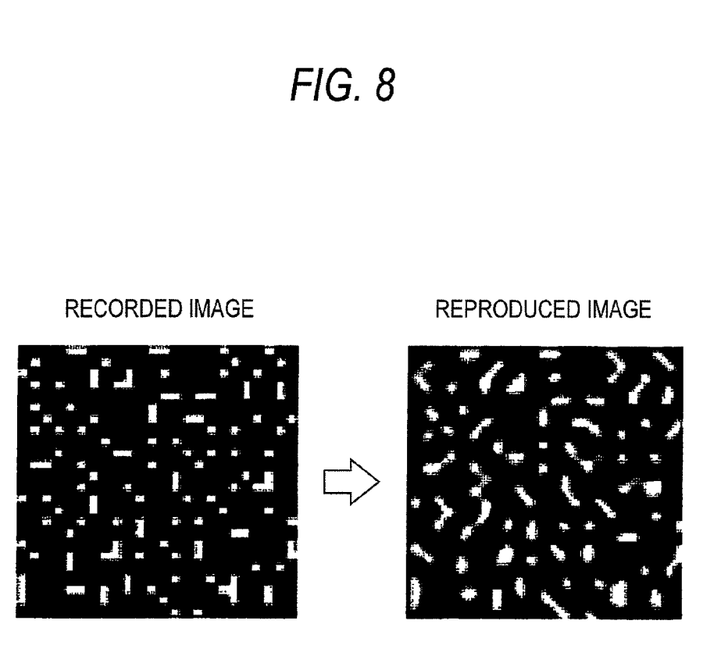
FIG. 8 is an explanatory view illustrating an example of a deterioration generated on a hologram reproduced image.
Figure 9:
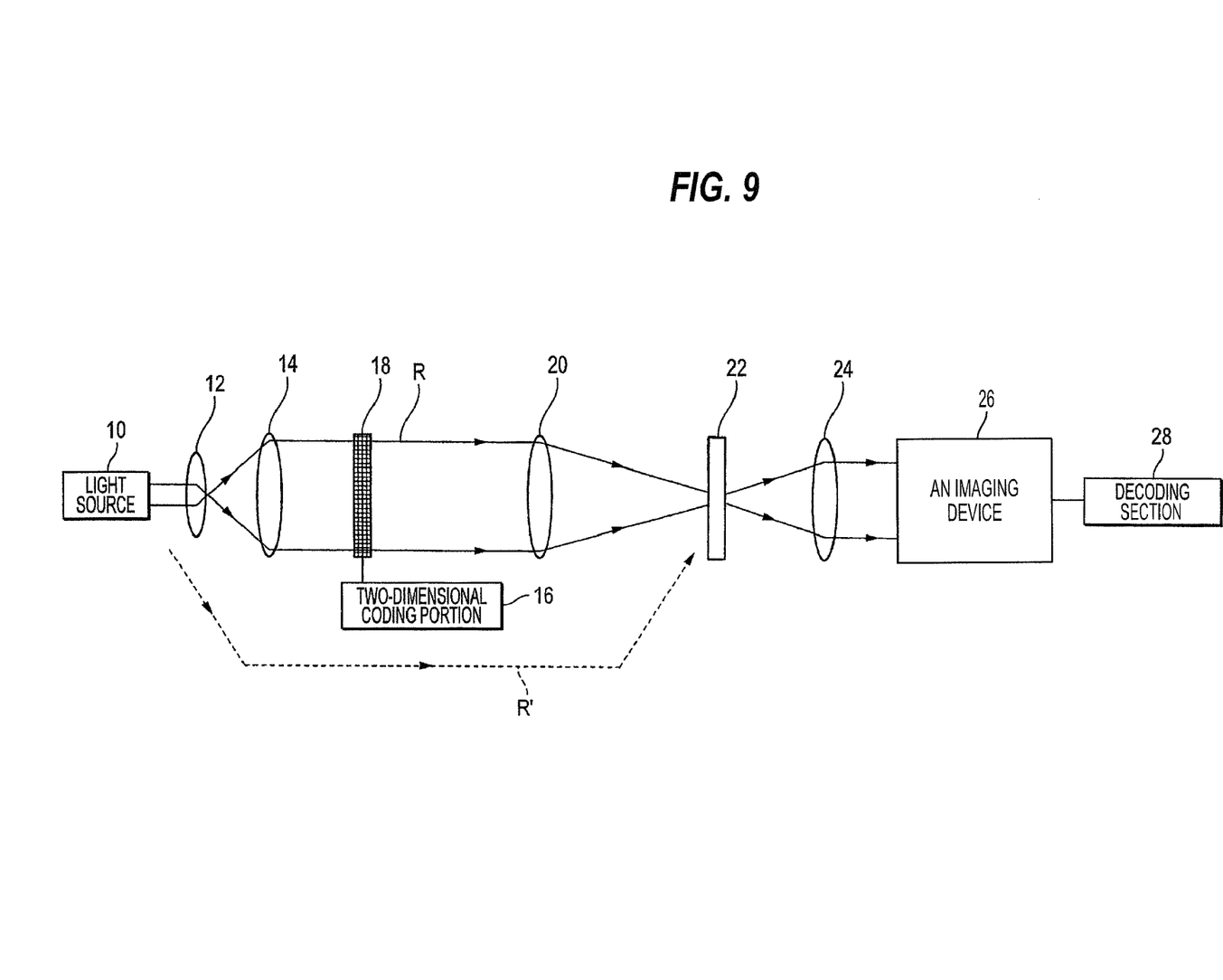
FIG. 9 is a view showing a hologram reading (reproducing) apparatus including a reading apparatus according to an exemplary embodiment of the invention.

According to the embodiment, the reproduced image is input from the optical recording medium 22 to the reproducing apparatus. The reproduced image is deteriorated as compared with the contrast pattern of the original encoded image (the luminance pattern shown in the recording pattern) due to an aperture for defining a recording spot size, for example, an effective diameter of the Fourier transform lens in a recording operation, or a multiple recording operation over the optical recording medium (FIG. 8).

The reproduced image is subjected to oversampling in more pixels than the number of pixels in the recording pattern. Then, the reproducing apparatus carries out pattern matching together with the decoding pattern having a large number of pixels than that in the recording pattern used in the recording operation and finds a decoding pattern which is coincident with a luminance of a pixel in each image element included in the reproduced image. By using a digital code associated with the decoding pattern thus found, thereafter, recorded digital information is reproduced and output.

The decoding pattern may be obtained by representing the recording pattern in more pixels than those in the recording pattern and applying a low-pass filter, for example.

In the embodiment, the deterioration generated in the reproduced image is estimated to make a comparison between more samples, thereby decoding the digital information. Therefore, it is possible to enhance decoding precision in the digital information.

Moreover, the luminance level calculating portion 36 described in the embodiment is not always required. For example, the decoding process portion 38 may carry out the decoding processing by setting an input whole reproduced image as a processing target, for example.

What is claimed is:

1. A hologram decoding apparatus comprising:
a light receiving unit including an imaging device that receives a reproduced image obtained by reading an encoded image from a hologram recording medium in which a Fourier transform image of the encoded image having n pixels representing digital information is recorded, wherein
n is an integer of 2 or more;
the imaging device outputs the reproduced image having k resolution pixel numbers; and
k is an integer more than n;
a storing unit that stores a plurality of decoding patterns and digital information corresponding to the decoding patterns, wherein
each decoding pattern has m pixels, and
k≧m>n; and
a decoding unit that refers to the decoding patterns stored in the storing unit to specify one of the decoding patterns which corresponds to the reproduced image, wherein
the decoding unit carries out a decoding process to decode the encoded image by setting the digital information corresponding to the specified decoding pattern as digital information of the reproduced image.

2. The hologram decoding apparatus according to claim 1, wherein each decoding pattern includes:
corresponding pixels, which are disposed in positions corresponding to those of the pixels in the encoded image, respectively; and
non-corresponding pixels disposed at middle points of adjacent pixels in the encoded image.

3. The hologram decoding apparatus according to claim 1, wherein the encoded image has the n pixels arranged two-dimensionally and periodically, and
wherein each decoding pattern includes:
corresponding pixels, which are disposed at positions corresponding to those of the pixels in the encoded image; and
non-corresponding pixels disposed at positions corresponding to respective middle points between pixels, in the encoded image, which are adjacent in a different direction from a periodical direction of the pixels in the encoded image.

4. A hologram decoding apparatus comprising:
a hologram recording medium in which a Fourier transform image of an encoded image having n pixels representing digital information is recorded, wherein n is an integer of 2 or more;
a reading light irradiating unit that irradiates a reading light on the hologram recording medium;
a light receiving unit that receives a reproduced image read from the hologram recording medium;
a storing unit that stores a decoding pattern and digital information corresponding to the decoding pattern, wherein
the decoding pattern has m pixels where m>n; and
the decoding pattern is configured to compensate for a predicted deterioration of the reproduced image transmitted from the hologram recording medium; and
a decoding unit that decodes the encoded image by decoding the digital information corresponding to the reproduced image based on the received reproduced image and the stored decoding pattern;
wherein the decoding unit outputs the decoded digital information.

5. A method for decoding a hologram, comprising:
receiving a reproduced image obtained by reading an encoded image from a hologram recording medium in which a Fourier transform image of the encoded image having n pixels representing digital information is recorded, wherein n is an integer of 2 or more; and
decoding the encoded image by decoding the digital information corresponding to the reproduced image based on the reproduced image, a decoding pattern, and digital information corresponding to the decoding pattern,
wherein the decoding pattern comprises m pixels where m>n, and
wherein the decoding pattern is configured to compensate for a predicted deterioration of the reproduced image transmitted from the hologram recording medium.

6. A non-transitory computer readable medium storing a program containing instructions for causing a computer to execute a hologram decoding process comprising:
receiving a reproduced image obtained by reading an encoded image from a hologram recording medium in which a Fourier transform image of the encoded image having n pixels representing digital information is recorded, wherein n is an integer of 2 or more; and
decoding the encoded image by decoding the digital information corresponding to the reproduced image based on the reproduced image, a decoding pattern, and digital information corresponding to the decoding pattern,
wherein the decoding pattern comprises m pixels where m>n; and
wherein the decoding pattern is configured to compensate for a predicted deterioration of the reproduced image transmitted from the hologram recording medium.

* * * * *